(12) United States Patent
Tatsuzawa et al.

(10) Patent No.: US 8,823,825 B2
(45) Date of Patent: Sep. 2, 2014

(54) IMAGE PROCESSING DEVICE, IMAGE PROCESSING METHOD, AND SOLID-STATE IMAGING DEVICE

(71) Applicant: Kabushiki Kaisha Toshiba, Tokyo (JP)

(72) Inventors: Yukiyasu Tatsuzawa, Kanagawa (JP); Kazuhiro Hiwada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/759,269

(22) Filed: Feb. 5, 2013

(65) Prior Publication Data

US 2013/0222625 A1      Aug. 29, 2013

(30) Foreign Application Priority Data

Feb. 24, 2012   (JP) .................................. 2012-038767

(51) Int. Cl.
*H04N 5/228*        (2006.01)
(52) U.S. Cl.
USPC ....................................................... 348/222.1
(58) Field of Classification Search
None
See application file for complete search history.

(56) References Cited

U.S. PATENT DOCUMENTS

| 5,455,621 | A | 10/1995 | Morimura |
| 7,609,320 | B2 | 10/2009 | Okamura |
| 8,115,818 | B2 | 2/2012 | Sawada |
| 2009/0109306 | A1* | 4/2009 | Shan et al. ..................... 348/273 |
| 2011/0169980 | A1* | 7/2011 | Cho et al. ................... 348/223.1 |

FOREIGN PATENT DOCUMENTS

| JP | 2868915 | 12/1998 |
| JP | 3074967 | 6/2000 |
| JP | 2001-238126 | 8/2001 |
| JP | 2005-332880 | 12/2005 |
| JP | 3801126 | 5/2006 |
| JP | 2007-49227 | 2/2007 |
| JP | 3974633 | 6/2007 |
| JP | 2010-283624 | 12/2010 |

OTHER PUBLICATIONS

Office Action issued on May 20, 2014 in Japanese Patent Application 2012-038767 (with English Translation).

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

According to one embodiment, a high dynamic range synthesizing circuit includes an interpolation processing unit. The interpolation processing unit generates an interpolated signal for a first pixel, which is set as a target pixel, through an interpolation process using a second image signal from a second pixel which is a peripheral pixel. The interpolation processing unit generates an interpolated signal for the second pixel, which is set as a target pixel, through an interpolation process using the first image signal from the first pixel which is a peripheral pixel.

20 Claims, 12 Drawing Sheets

IMAGE PROCESSING DEVICE, IMAGE PROCESSING METHOD, AND SOLID-STATE IMAGING DEVICE

CROSS-REFERENCE TO RELATED APPLICATIONS

This application is based upon and claims the benefit of priority from Japanese Patent Application No. 2012-038767, filed on Feb. 24, 2012; the entire contents of all of which are incorporated herein by reference.

FIELD

Embodiments described herein relate generally to an image processing device, an image processing method, and a solid-state imaging device.

BACKGROUND

High dynamic range (HDR) synthesis is known as an imaging technique for expressing a dynamic range wider than that in a normal technique. As a method of the HDR synthesis, for example, there is a method of synthesizing two or more images acquired with different exposure amounts (charge accumulation periods). According to this method, a frame rate of a synthesized image may be delayed for an output period of an image sensor. For this reason, when a moving image is particularly captured, there is a problem that a blur of a subject image (motion blur) easily occurs.

Further, another method for the HDR synthesis, for example, there is a method of pairing two lines set to have different charge accumulation periods and adding signal charges of pixels having different charge accumulation periods for each pair of lines. According to this method, since the resolution in the vertical direction of a line is substantially a half of the resolution of a normal case, an image quality may deteriorate.

DETAILED DESCRIPTION

In general, according to one embodiment, an image processing device includes a high dynamic range synthesizing circuit. The high dynamic range synthesizing circuit synthesizes first and second image signals. The first image signal is an image signal in accordance with the amount of incident light on a first pixel during a first charge accumulation period. The second image signal is an image signal in accordance with the amount of incident light on a second pixel during a second charge accumulation period. The second charge accumulation period is shorter than the first charge accumulation period. The high dynamic range synthesizing circuit includes a signal level adjusting unit, an interpolation processing unit, and an expansion processing unit. The signal level adjusting unit adjusts a signal level of the second image signal in accordance with a ratio between the first and second charge accumulation periods. The first image signal and the second image signal of which the signal level is adjusted by the signal level adjusting unit are input to the interpolation processing unit. The interpolation processing unit generates interpolated signals. The expansion processing unit performs an expansion process by a signal level exceeding an output saturation level between the interpolated signals. The output saturation level is a signal level at which saturation of an output charge for the amount of incident light during the first charge accumulation period occurs. The interpolation processing unit generates the interpolated signal through an interpolation process on the first pixel, which is set as a target pixel, using the second image signal from each second pixel which is a peripheral pixel. The interpolation processing unit generates the interpolated signal through an interpolation process on the second pixel, which is set as a target pixel, using the first image signal from each first pixel which is a peripheral pixel. The peripheral pixel is a pixel located in the periphery of the target pixel.

Hereinafter, an image processing device, an image processing method, and a solid-state imaging device according to embodiments will be described in detail below with reference to the appended drawings. The invention is not limited to the embodiments.

Figure 1:
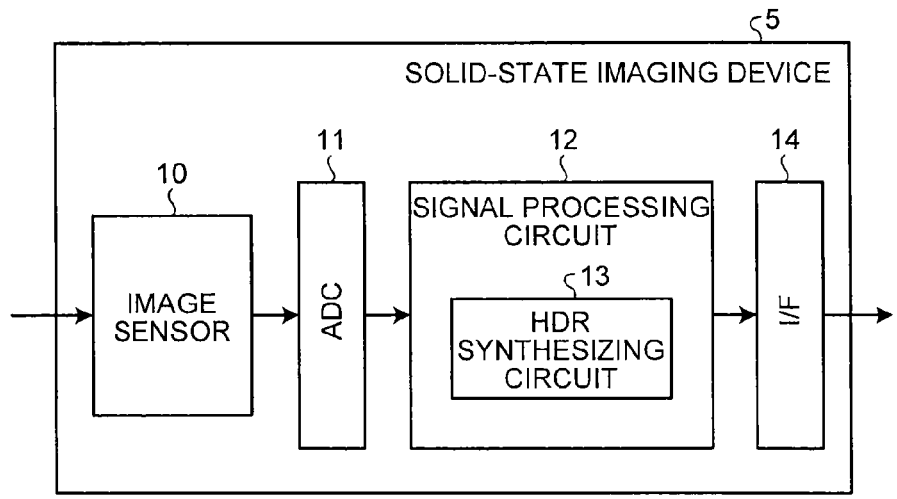
FIG. 1 is a block diagram illustrating the overall configuration of a solid-state imaging device according to a first embodiment.
Figure 2:
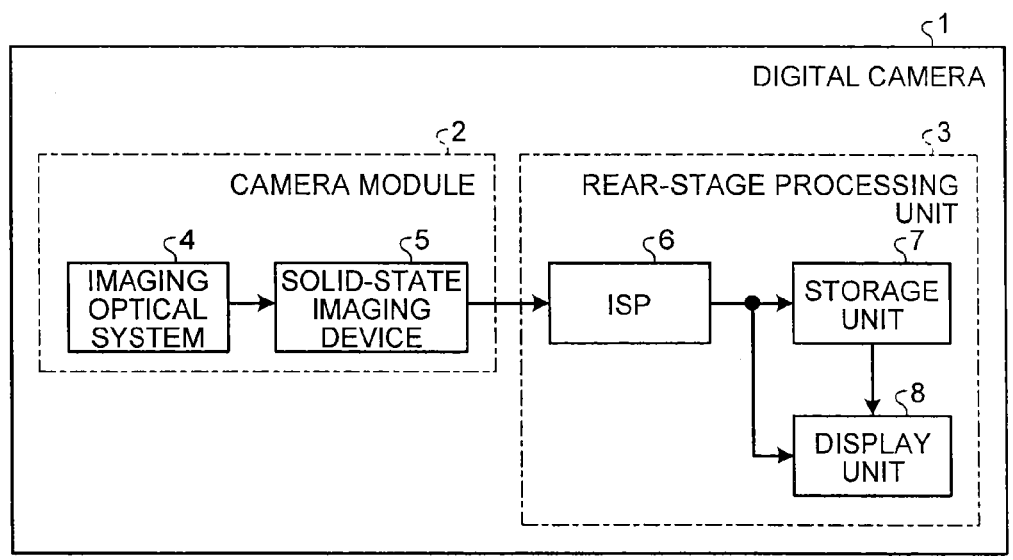
FIG. 2 is a block diagram illustrating the overall configuration of a digital camera including the solid-state imaging device illustrated in FIG. 1.

FIG. 1 is a block diagram illustrating the overall configuration of a solid-state imaging device according to a first embodiment. FIG. 2 is a block diagram illustrating the overall configuration of a digital camera including the solid-state imaging device illustrated in FIG. 1.

A digital camera 1 includes a camera module 2 and a rear-stage processing unit 3. The camera module 2 includes an imaging optical system 4 and a solid-state imaging device 5. The rear-stage processing unit 3 includes an image signal processor (ISP) 6, a storage unit 7, and a display unit 8. The camera module 2 is applied not only to the digital camera 1 but also to an electronic device, for example, a camera-attached portable terminal.

The imaging optical system 4 acquires light from a subject and forms a subject image. The solid-state imaging device 5 captures the subject image. The ISP 6 performs signal processing on an image signal which is obtained through the imaging performed by the solid-state imaging device 5. The storage unit 7 stores an image subjected to the signal processing by the ISP 6. The storage unit 7 outputs the image signal to the display unit 8 in response to a user's operation or the like. The display unit 8 displays the image according to the image signal input from the ISP 6 or the storage unit 7. The display unit 8 is, for example, a liquid crystal display.

The solid-state imaging device 5 is, for example, a complementary metal oxide semiconductor (CMOS) image sensor. The solid-state imaging device 5 may be a charge coupled device (CCD), as well as the CMOS image sensor. The solid-state imaging device 5 includes an image sensor 10, an analog-to-digital converter (ADC) 11, a signal processing circuit 12, and an interface (I/F) 14.

The image sensor 10 converts the light acquired by the imaging optical system 4 into a signal charge by a photodiode to capture a subject image. For example, the image sensor 10 generates an analog image signal by acquiring the signal values of respective color components of red (R), green (G), and blue (B) in order corresponding to a Bayer array. The ADC 11 converts the image signal of an analog system from the image sensor 10 to an image signal of a digital system.

The signal processing circuit 12 performs various kinds of signal processing on the digital image signal input from the ADC 11. The signal processing circuit 12 includes a high dynamic range (HDR) synthesizing circuit 13. The HDR synthesizing circuit 13 performs HDR synthesis on the digital image signal input to the signal processing circuit 12. The signal processing circuit 12 performs not only the HDR synthesis by the HDR synthesizing circuit 13 but also signal processing such as defect correction, noise reduction, shading correction, and white balance adjustment.

The I/F 14 outputs the image signal subjected to the signal processing by the signal processing circuit 12. The I/F 14 may perform conversion from serial input to parallel output or conversion from parallel input to serial output.

Figure 3:
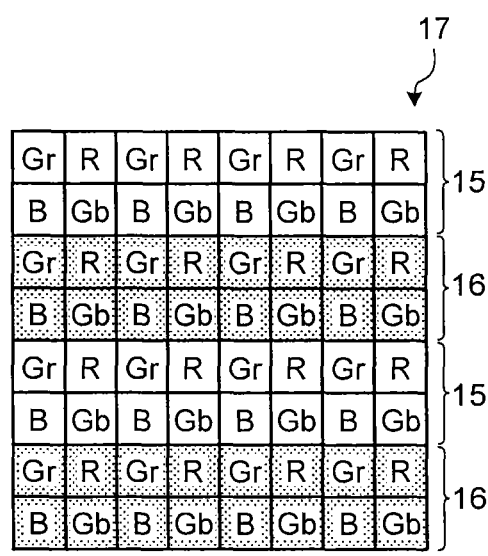
FIG. 3 is a diagram illustrating the array of pixels in an image sensor.

FIG. 3 is a diagram illustrating the array of pixels in the image sensor. A pixel array 17 included in the image sensor 10 is installed in as a Bayer array of four Gr, R, Gb, and B pixels. The R pixel detects R light. The B pixel detects B light. The Gr and Gb pixels detect G light. The Gr pixel is parallel to the R pixel in a horizontal line. The Gb pixel is parallel to the B pixel in a horizontal line.

In the pixel array 17, the charge accumulation periods are alternately set to be different for each line area including two horizontal lines of a Gr/R line and a B/Gb line. A first charge accumulation period which is a charge accumulation period of a long-time exposure line area (first line area) 15 is longer than a second charge accumulation period which is a charge accumulation period of a short-time exposure line area (second line area) 16.

The long-time exposure line area 15 includes two horizontal lines formed by long-time exposure pixels which are first pixels. The short-time exposure line area 16 includes two horizontal lines formed by short-time exposure pixels which are second pixels. The long-time exposure line area 15 and the short-time exposure line area 16 are alternately disposed in the vertical direction.

The image sensor 10 outputs a first image signal according to the amount of incident light on the long-time exposure pixels during the first charge accumulation period and a second image signal according to the amount of incident light on the short-time exposure pixels during the second charge accumulation period. The HDR synthesizing circuit 13 synthesizes the first and second image signals input to the signal processing circuit 12.

Figure 4:
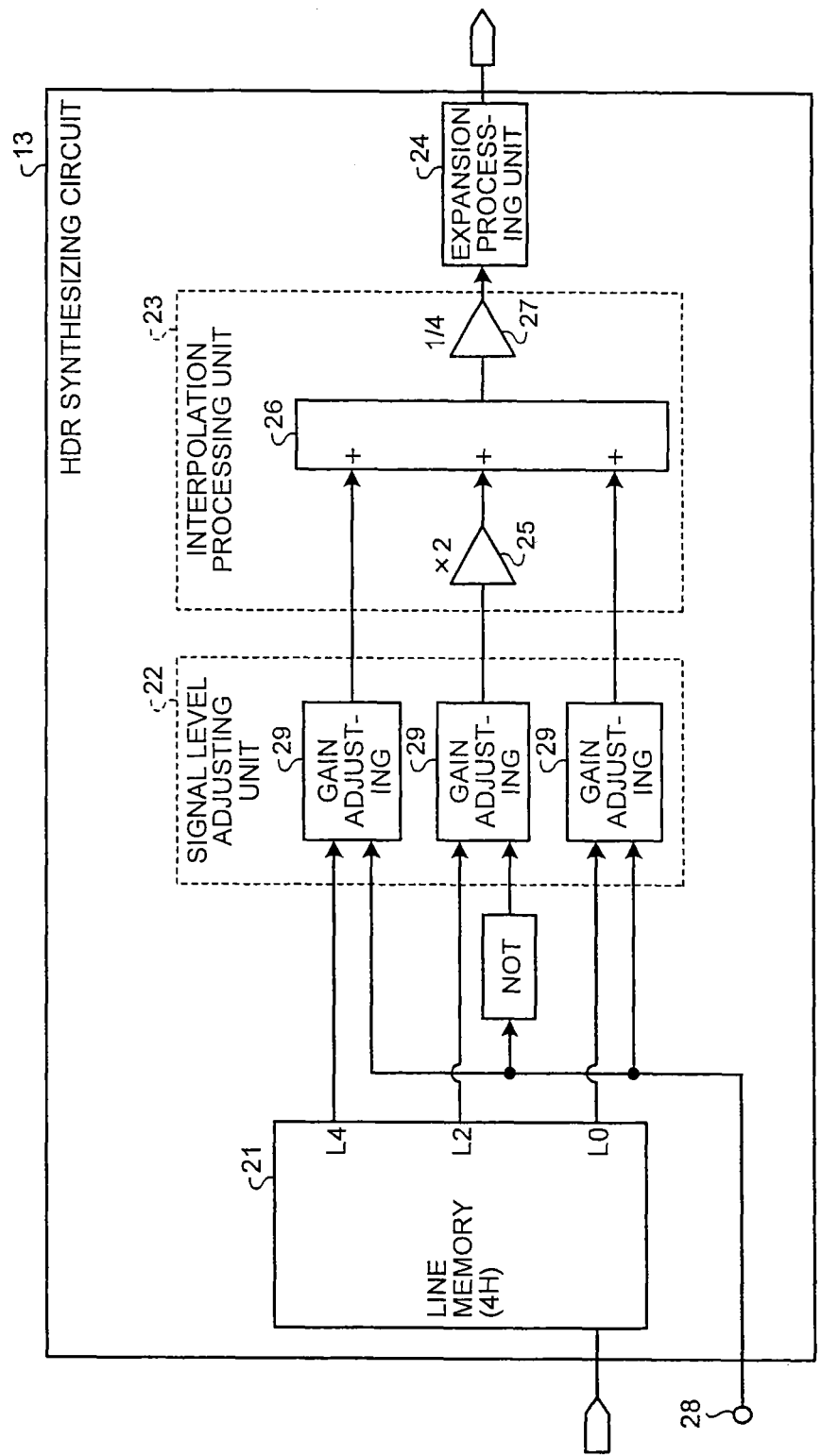
FIG. 4 is a block diagram illustrating the configuration of an HDR synthesis circuit.

FIG. 4 is a block diagram illustrating the configuration of the HDR synthesizing circuit. The HDR synthesizing circuit 13 includes a line memory (4H) 21, a signal level adjusting unit 22, an interpolation processing unit 23, and an expansion processing unit 24.

The line memory 21 retains digital image signals corresponding to four lines input to the HDR synthesizing circuit 13. The signal level adjusting unit 22 adjusts the signal level of the image signal. The interpolation processing unit 23 performs a process of interpolating the image signal. The expansion processing unit 24 performs a process of expanding the image signal.

Figure 5:
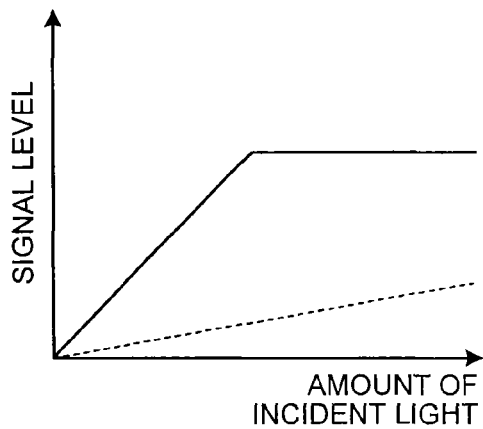
FIG. 5 is a diagram illustrating output characteristics of a long-time exposure pixel and a short-time exposure pixel and synthesis of an image signal by the HDR synthesizing circuit.
Figure 5:
Figure 5:
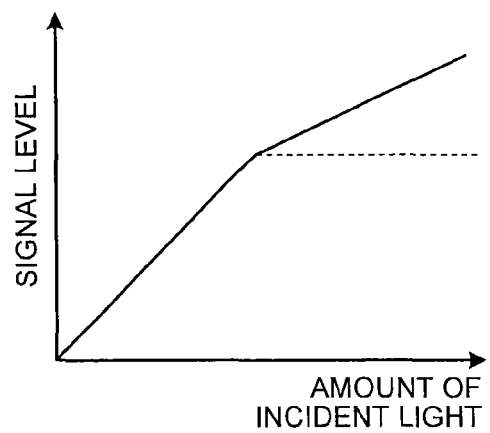
Figure 5:
Figure 5:
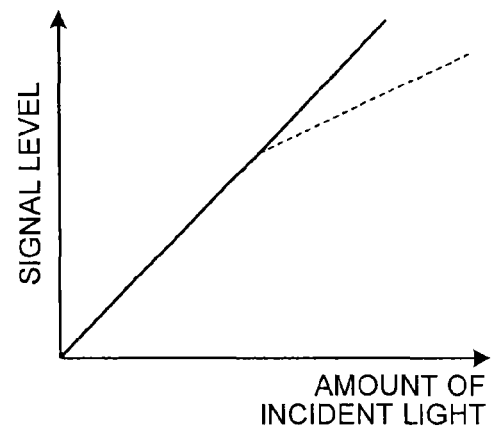

FIG. 5 is a diagram illustrating output characteristics of the long-time exposure pixel and the short-time exposure pixel and synthesis of the image signals by the HDR synthesizing circuit. In the long-time exposure pixel, when the amount of incident light is higher than a predetermined saturated amount of light, a signal charge generated through photoelectric conversion reaches an accumulation capacitance of a photodiode.

In the graph illustrated in the upper stage of FIG. 5, a signal level output from the long-time exposure pixel is indicated by a solid line and a signal level output from the short-time exposure pixel is indicated by a dashed line. When the amount of incident light is equal to or less than the saturated amount of light, the signal level output from the long-time exposure pixel increases with an increase of the amount of incident light. The signal level output from the short-time exposure pixel increases with an increase in the amount of incident light, even when the amount of incident light is greater than the saturated amount of light of the long-time exposure pixel.

The signal level adjusting unit 22 multiplies a second image signal obtained by the short-time exposure pixel by a predetermined gain in order to accord the output levels of the long-time exposure pixel with the short-time exposure pixels. The gain corresponds to an exposure ratio which is a ratio between the first charge accumulation period of the long-time exposure pixel and the second charge accumulation period of the short-time exposure pixel.

The interpolation processing unit 23 adds the first image signal obtained by the long-time exposure pixel and the second image signal obtained by the short-time exposure pixel and adjusted by the signal level adjusting unit 22. In the graph illustrated in the intermediate stage of FIG. 5, a signal level subjected to the addition by the interpolation processing unit 23 is indicated by a solid line.

The signal level subjected to the addition by the interpolation processing unit 23 shows different characteristics in that a change in the amount of incident light is different before and after the saturated amount of light (knee characteristics). The expansion processing unit 24 performs an expansion process by the signal level exceeding the output saturation level corresponding to the saturated amount of light through the interpolation process of the interpolation processing unit 23 (knee expansion). Thus, the HDR synthesizing circuit 13 acquires the HDR synthesized signal having an approximated linear characteristic before and after the saturated amount of light. In the graph illustrated in the lower stage of FIG. 5, a signal level subjected to the expansion process by the expansion processing unit 24 is indicated by a solid line.

As illustrated in FIG. 4, among four horizontal lines (referred to as line L1 to L4) retained in the line memory 21 and one horizontal line (referred to as a line L0) immediately before retained by the line memory 21, three lines L0, L2, and L4 containing an image signal from the same color pixel are input to the signal level adjusting unit 22.

The signal level adjusting unit 22 includes three gain adjusting circuits 29 in correspondence with the lines to be input. The gain adjusting circuit 29 performs gain adjustment by multiplying the second image signal from the short-time exposure line area 16 (see FIG. 3) among the three horizontal lines by the exposure ratio.

A line identification count 28 is a signal indicating that the middle line L2 among the three horizontal lines is one of the first image signal from the long-time exposure line area 15 and the second image signal from the short-time exposure line area 16. For example, when the line L2 is the first image signal, the line identification count 28 is assumed to be "1." When the line L2 is the second image signal, the line identification count 28 is assumed to be "0."

In the signal level adjusting unit 22, the line identification count 28 subjected to inversion (NOT) is input to the gain adjusting circuit 29 to which the line L2 is input. The line identification count 28 not subjected to the inversion is input to the gain adjusting circuits 29 to which the lines L0 and L4 other than the line L2 are input.

Figure 6:
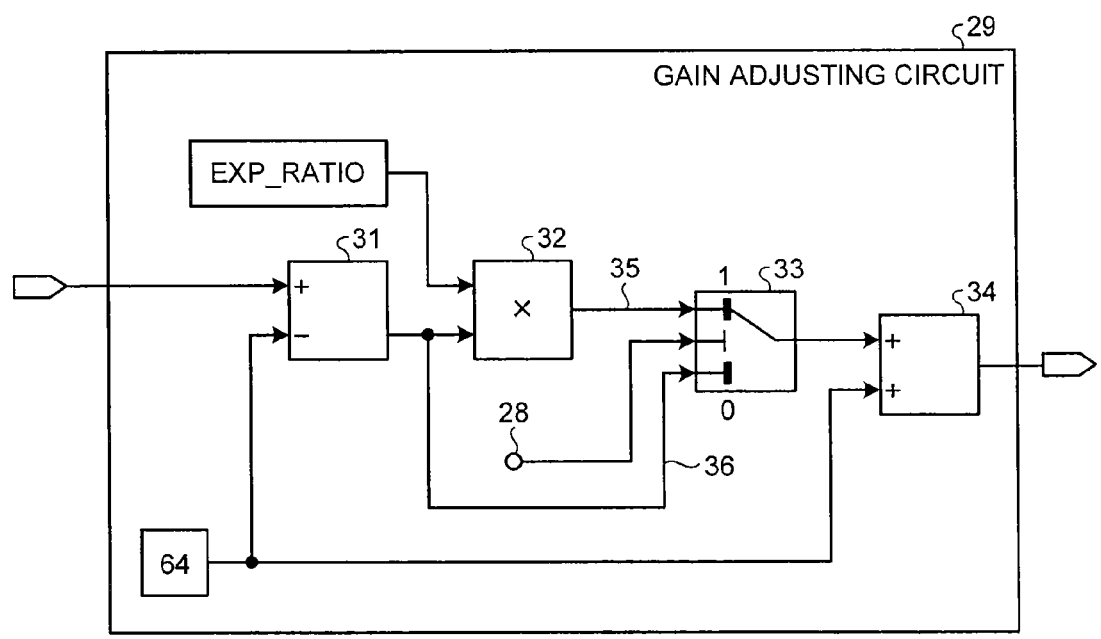
FIG. 6 is a block diagram illustrating the configuration of a gain adjusting circuit.

FIG. 6 is a block diagram illustrating the configuration of the gain adjusting circuit. An subtracter 31 subtracts a predetermined black level (for example, 64 LSB) from an input line. A multiplier 32 multiplies the output from the subtracter 31 by an exposure ration (EXP_RATIO).

A selector 33 selects one of a signal 35 from the multiplier 32 and a signal 36 from the subtracter 31 by setting the line identification count 28 input to the gain adjusting circuit 29 as a selection control input signal. When the selection control input signal is "1," the selector 33 selects the signal 35 obtained after the multiplication of EXP_RATIO by the multiplier 32. When the selection control input signal is "0," the selector 33 selects the signal 36 before the multiplication of EXP_RATIO. An adder 34 adds the selection result of the selector 33 and a black level. The gain adjusting circuit 29 outputs the addition result of the adder 34.

When the line L2 is the first image signal from the long-time exposure line area 15, "1" is input as the line identification count 28 to the HDR synthesizing circuit 13. In this case, the lines L0 and L4 are both the second image signals from the short-time exposure line area 16.

In this case, the line identification count 28 inverted from "1" to "0" is input to the gain adjusting circuit 29 for the line L2. In the gain adjusting circuit 29 for the line L2, the selector 33 selects the signal 36 before the multiplication of EXP_RATIO. The line identification count 28 remaining to be "1" is input to the gain adjusting circuit 29 for the line L0 and the gain adjusting circuit 29 for the line L4. In the gain adjusting circuit 29 for the line L0 and the gain adjusting circuit 29 for the line L4, the selectors 33 selects the signal 35 obtained through the multiplication of EXP_RATIO.

When the line L2 is the second image signal from the short-time exposure line area 16, "0" is input as the line identification count 28 to the HDR synthesizing circuit 13. In this case, the lines L0 and L4 are both the first image signal from the long-time exposure line area 15.

In this case, the line identification count 28 inverted from "0" to "1" is input to the gain adjusting circuit 29 for the line L2. In the gain adjusting circuit 29 for the line L2, the selector 33 selects the signal 35 obtained through the multiplication of EXP_RATIO. In the gain adjusting circuit 29 for the line L0 and the gain adjusting circuit 29 for the line L4, the selectors 33 select the signal 36 before the multiplication of EXP_RATIO.

Thus, the signal level adjusting unit 22 selectively multiplies the second image signal between the first and second image signals by the exposure ratio and accords the output level of the short-time exposure pixel with the output level of the long-time exposure pixel. For example, when it is assumed that the image signal output from the image sensor 10 is a 10-bit signal and EXP_RATIO is 16 times, 14 bits can be obtained as the number of output bits for the synthesized image.

The second image signal of which the signal level is adjusted by the signal level adjusting unit 22 and the first image signal are input to the interpolation processing unit 23. In the interpolation processing unit 23, a multiplier 25 doubles the signal level of the line L2 among the three lines from the signal level adjusting unit 22. The adder 26 adds the lines L0 and L4 input to the interpolation processing unit 23 and the line L2 from the multiplier 25. A multiplier 27 multiplies the addition result of the adder 26 by ¼. The interpolation processing unit 23 outputs the multiplication result of the multiplier 27 as an interpolation signal.

Figure 7:
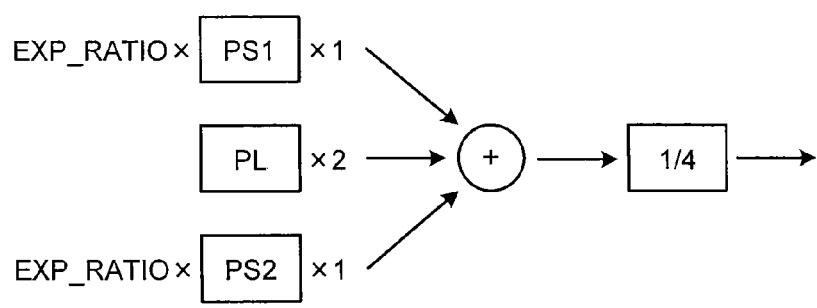
FIG. 7 is a diagram illustrating the concept of a process of interpolating the long-time exposure pixel.

FIG. 7 is a diagram illustrating the concept of a process of interpolating the long-time exposure pixel. In a process of interpolating a long-time exposure pixel PL which is a target pixel to be subjected to HDR synthesis, the interpolation processing unit 23 uses a first image signal from the long-time exposure pixel PL and second image signals from two short-time exposure pixels PS1 and PS2 which are peripheral pixels located in the periphery of the long-time exposure pixel PL.

The peripheral pixels are eight pixels that are included in a 5×5 pixel block centering on the target pixel. The peripheral pixels and the target pixel are pixels of the same color. The short-time exposure pixels PS1 and PS2 which are the peripheral pixels are pixels with the same color as that of the long-time exposure pixel PL which is the target pixel. Among the peripheral pixels, the short-time exposure pixels PS1 and PS2 are each parallel to the long-time exposure pixel PL, which is the target pixel, via one pixel in the vertical direction. The short-time exposure pixels PS1 and PS2 are included in the short-time exposure line area 16 adjacent to the long-time exposure line area 15 including the long-time exposure pixel PL.

The interpolation processing unit 23 adds the second image signal of the short-time exposure pixel PS1 multiplied by EXP_RATIO, the first image signal of the long-time exposure pixel PL, and the second image signal of the short-time exposure pixel PS2 multiplied by EXP_RATIO at a ratio of 1:2:1 and multiplies the result by ¼. An interpolated signal subjected to the interpolation process and output by the interpolation processing unit 23 includes 50% of a signal component originated from the long-time exposure pixel PL.

Figure 8:
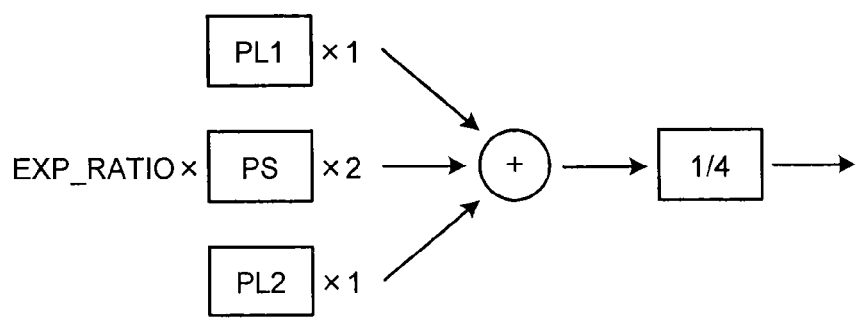
FIG. 8 is a diagram illustrating the concept of a process of interpolating the short-time exposure pixel.

FIG. 8 is a diagram illustrating the concept of a process of interpolating the short-time exposure pixel. In a process of interpolating a short-time exposure pixel PS which is a target pixel to be subjected to HDR synthesis, the interpolation processing unit 23 uses a second image signal from the short-time exposure pixel PS and first image signals from two long-time exposure pixels PL1 and PL2 which are located in the periphery of the short-time exposure pixel PS.

The long-time exposure pixels PL1 and PL2 are pixels with the same color as that of the short-time exposure pixel PS. The long-time exposure pixels PL1 and PL2 are each parallel to the short-time exposure pixel PS via one pixel in the vertical direction. The long-time exposure pixels PL1 and PL2 are included in the long-time exposure line area 15 adjacent to the short-time exposure line area 16 including the short-time exposure pixel PS.

The interpolation processing unit 23 adds the first image signal of the long-time exposure pixel PL1, the second image signal of the short-time exposure pixel PS multiplied by EXP_RATIO, and the first image signal of the long-time exposure pixel PL2 at a ratio of 1:2:1 and multiplies the result by ¼. An interpolated signal subjected to the interpolation process and output by the interpolation processing unit 23 includes 50% of a signal component originated from the long-time exposure pixels PL1 and PL2.

When a moving subject is photographed, the solid-state imaging device 5 can obtain a subject image in which the shorter an exposure time is, the smaller blur is. Between the long-time exposure pixel and the short-time exposure pixel, a difference occurs to the extent of blur occurring in a subject image. When the long-time exposure pixel and the short-time exposure pixel are applied, a ratio between a signal component originated from the long-time exposure pixel and a signal component originated from the short-time exposure pixel may be considerably changed before and after the amount of incident light reaches a saturated amount of light.

The interpolation processing unit 23 performs an interpolation process such that the signal component originated from the long-time exposure pixel and the signal component originated from the short-time exposure pixel are equally included. Even when a ration between the first and second image signals is changed, the interpolation processing unit 23 can ensure sufficient continuity of the interpolated signal with respect to the amount of incident light.

Thus, the HDR synthesizing circuit 13 can perform the HDR synthesis such that a variation in the change of the signal level with respect to the amount of incident light is suppressed before and after the saturated amount of light. By suppressing the variation in the signal level useless in the HDR synthesis, the solid-state imaging device 5 reduces a defect such as a false color, when a moving subject is photographed. Accordingly, the solid-state imaging device 5 can obtain a high-quality image.

Figure 9:
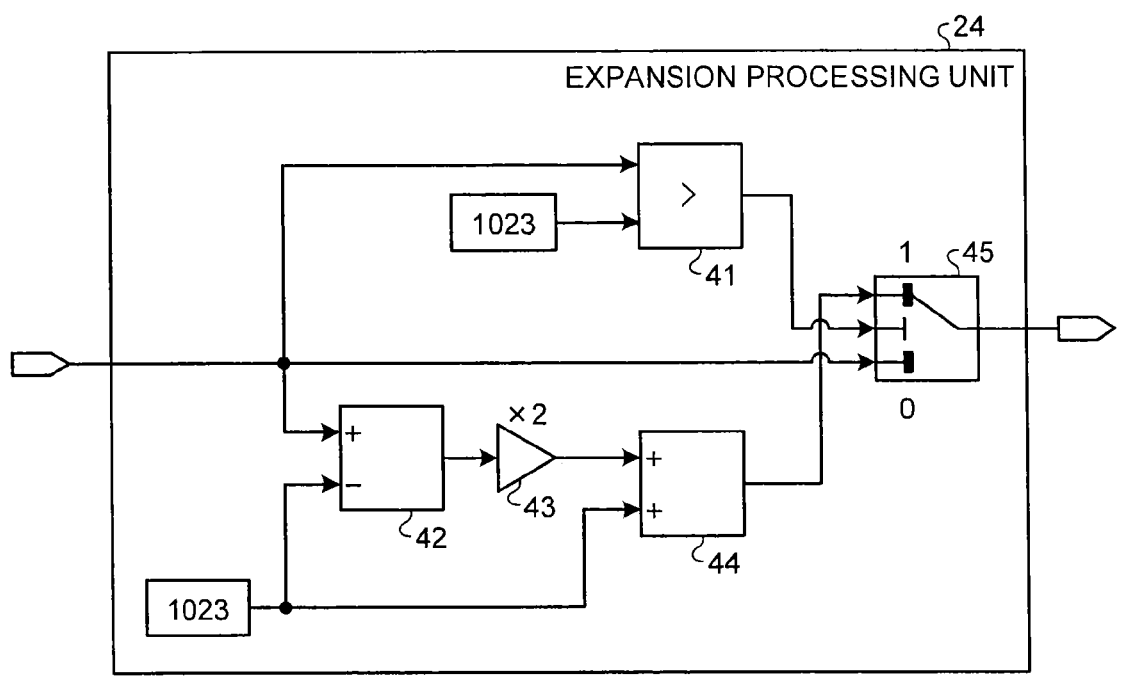
FIG. 9 is a block diagram illustrating the configuration of an expansion processing unit.

FIG. 9 is a block diagram illustrating the configuration of the expansion processing unit. A comparator 41 compares the interpolated signal input from the interpolation processing unit 23 to the expansion processing unit 24 with a predetermined output saturation level (for example, 1023 LBS). The comparator 41 outputs, for example, "1" as a comparison result, when the interpolated signal input to the expansion processing unit 24 is greater than the output saturation level. The comparator 41 outputs, for example, "0" as a comparison result, when the interpolated signal input to the expansion processing unit 24 is equal to or less than the outputs saturated level.

A subtracter 42 subtracts the output saturation level from the interpolated signal input to the expansion processing unit 24. A multiplier 43 multiples the subtraction result of the subtracter 42 by 2 as an expansion ratio. The multiplier 43 performs multiplication on a signal level exceeding the output saturation level in the interpolation process of the interpolation processing unit 23 to perform the expansion process. An adder 44 adds the output saturation level to the multiplication result of the multiplier 43.

A selector 45 selects any one of a signal from the adder 44 and the interpolated signal input to the expansion processing unit 24 by using the comparison result from the comparator 41 as a selection control input signal. When the selection control input signal is "1," the selector 45 selects the signal subjected to the expansion process performed using the multiplier 43 and output from the adder 44. When the selection control input signal is "0," the selector 45 selects the interpolated signal before the expansion process.

Thus, the expansion processing unit 24 performs the expansion process on the signal that becomes a level higher than the output saturation level through the HDR synthesis by the exceeding level from the output saturation level. The expansion processing unit 24 outputs the signal selected by the selector 45. The HDR synthesizing circuit 13 outputs the signal from the expansion processing unit 24 as a synthesized image signal.

The HDR synthesizing circuit 13 can suppress the blur of a subject image, compared to a case in which images of a plurality of frames are synthesized, by performing the HDR synthesis using the first image signals from the long-time exposure pixels and the second image signals from the short-time exposure pixels. The HDR synthesizing circuit 13 can acquire a synthesized image without a reduction in the resolution of the image sensor 10 by performing the interpolation process on the output from the long-time exposure line area 15 and the output from the short-time exposure line area 16. Thus, the HDR synthesizing circuit 13 can suppress the blur of a subject image and the reduction in the resolution, and thus can perform effective high dynamic range synthesis.

Each circuit configuration described in this embodiment may be a configuration in which the functions described in this embodiment can be realized and may be appropriately modified.

Figure 10:
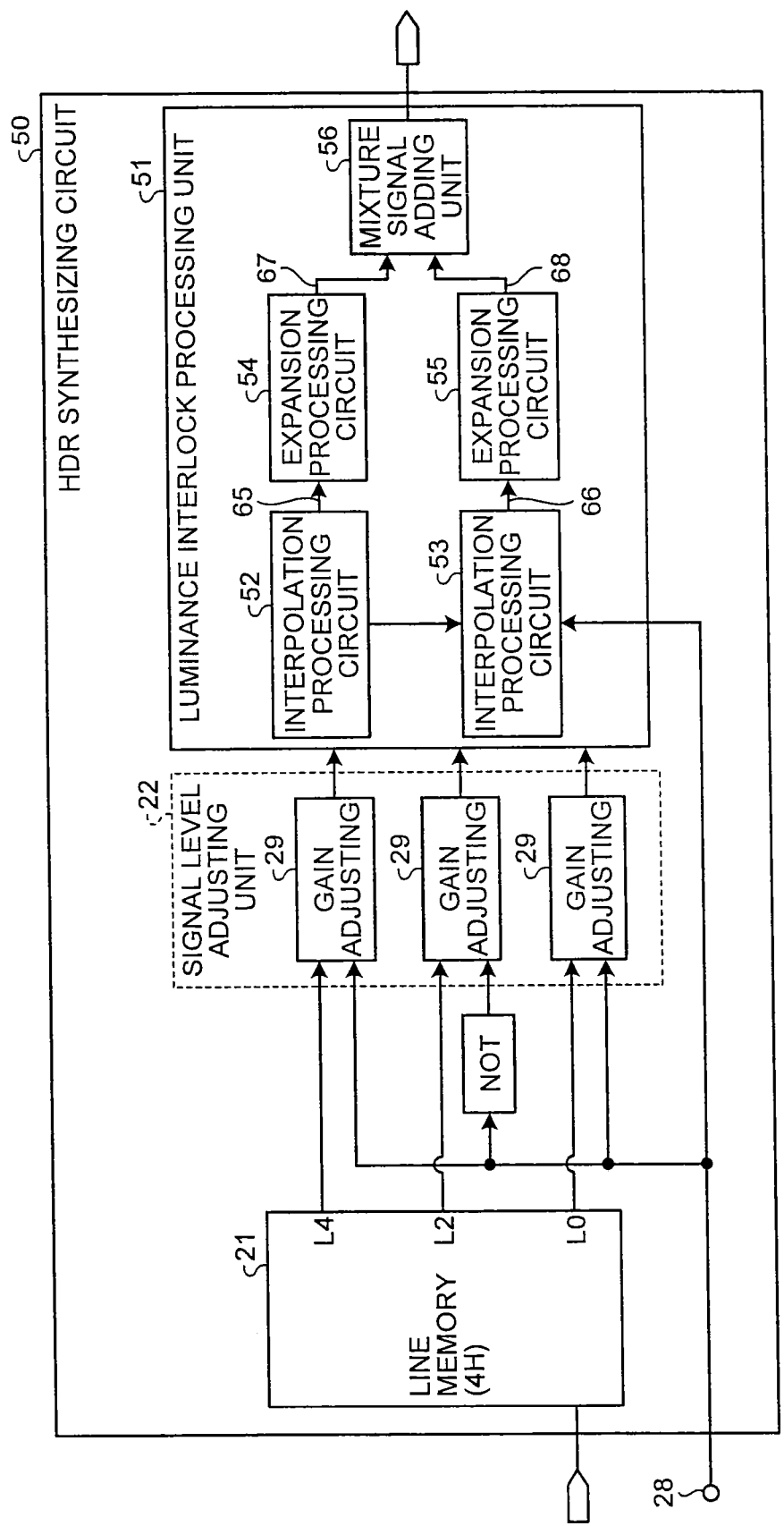
FIG. 10 is a block diagram illustrating the configuration of an HDR synthesizing circuit applied to an image processing device according to a second embodiment.

FIG. 10 is a block diagram illustrating the configuration of an HDR synthesizing circuit applied to an image processing device according to a second embodiment. An HDR synthesizing circuit 50 according to this embodiment is applied to a signal processing circuit 12 (see FIG. 1). The same reference numerals are given to the same constituent elements as those of the first embodiment, and the description thereof will be not repeated.

The HDR synthesizing circuit 50 includes a line memory (4H) 21, a signal level adjusting unit 22, and a luminance interlock processing unit 51. The luminance interlock processing unit 51 includes interpolation processing circuits 52 and 53, expansion processing circuits 54 and 55, and a mixture signal adding unit 56.

The interpolation processing circuits 52 and 53 function as interpolation processing units that perform an interpolation process on an image signal. The expansion processing circuits 54 and 55 function as expansion processing units that perform an expansion process on an image signal. The mixture signal adding unit 56 adds first and second mixture signals to be described below.

Figure 11:
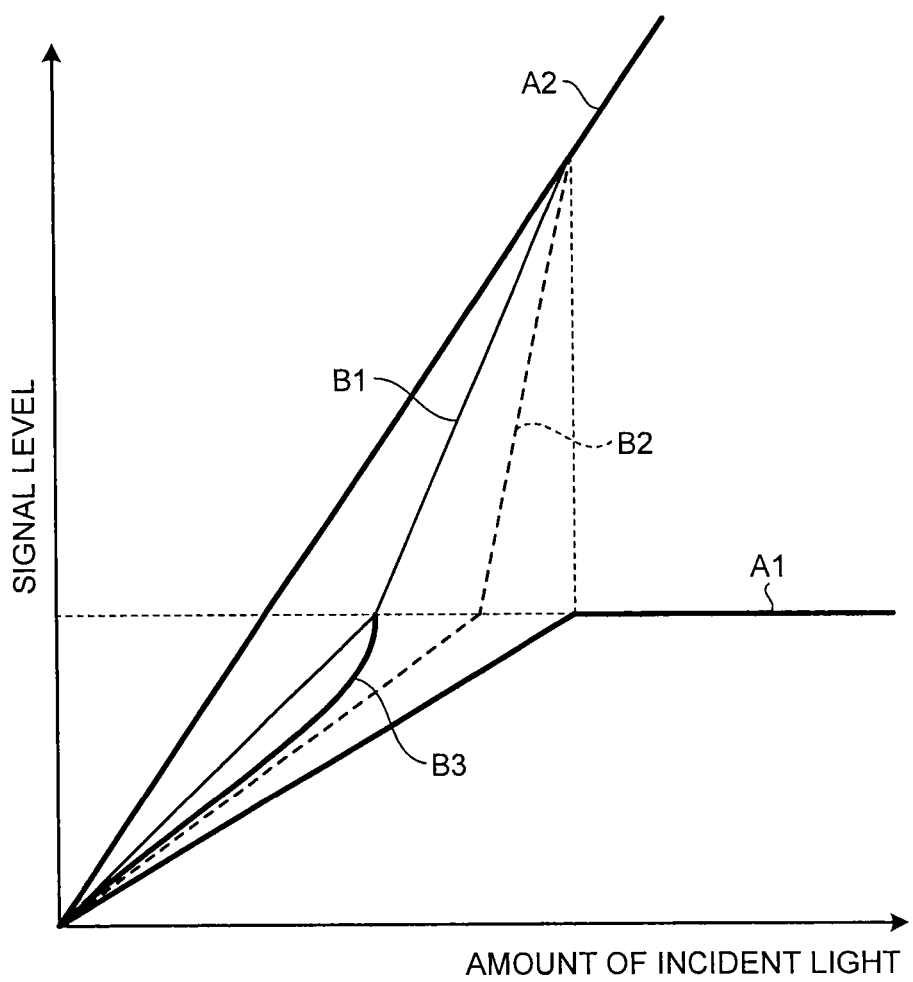
FIG. 11 is a diagram illustrating output characteristics of a long-time exposure pixel and a short-time exposure pixel and synthesis of an image signal by the HDR synthesizing circuit.

FIG. 11 is a diagram illustrating output characteristics of a long-time exposure pixel and a short-time exposure pixel and synthesis of an image signal by the HDR synthesizing circuit. A solid line A1 indicates a relation between the amount of incident light on a long-time exposure pixel and the level of a first image signal. A solid line A2 indicates a relation between the amount of incident light to a short-time exposure pixel and the level of a second image signal adjusted at an exposure ratio EXP_RATIO.

A solid line B1 indicates a relation between the amount of incident light and the level of a synthesized signal which includes 50% of a signal component originated from the long-time exposure pixel and is subjected to the interpolation process. HDR synthesis performed to obtain the synthesized signal indicated by B1 is appropriately referred to as "50% blend synthesis" below. The HDR synthesizing circuit 13 according to the first embodiment performs 50% blend synthesis.

A dashed line B2 indicates a relation between the amount of incident light and the level of a signal which includes 75% of the signal component originated from the long-time exposure pixel and is subjected to the interpolation process. HDR synthesis performed to obtain a synthesized signal indicated by B2 is appropriately referred to as "75% blend synthesis" below. A solid line B3 indicates a relation between the amount of incident light and the level of a signal subjected to a luminance interlock process according to this embodiment.

A synthesized signal by the 50% blend synthesis will be compared with a synthesized signal by the 75% blend synthesis. In the case of the 50% blend synthesis, as described in the first embodiment, the variation in the signal level useless in the HDR synthesis can be minimized, and thus the defect such as a false color can be effectively reduced.

A reduction in a signal-to-noise ratio (SNR) may occur more easily due to an influence of quantization noise in the signal component originated from the short-time exposure pixel than in the signal component originated from the long-time exposure pixel, since EXP_RATIO is multiplied. For example, as the amount of incident light is less than the saturated amount of light and illuminance is lower, the reduction in the SNR in the signal component originated from the short-time exposure pixel is more considerable. Therefore, in the case of the low illuminance for which the SNR is required to be ensured, the synthesized signal by the 75% blend synthesis can reduce the deterioration in an image quality caused due to noise more than the synthesized signal by the 50% blend synthesis.

The HDR synthesizing circuit 50 according to this embodiment generates mixture signals in which the ratio between the first and second image signals are different, and also adjusts a ratio of the mutually added mixture signals in accordance with luminance. For example, the HDR synthesizing circuit 50 increases the ratio of the mixture signal by the 75% blend synthesis with respect to the amount of incident light less than the saturated amount of light, as the amount of incident light is lower. Through the luminance interlock process, the HDR synthesizing circuit 50 generates the synthesized signal indicated by the solid line B3. The HDR synthesizing circuit 50 sets the mixture signal by the 50% blend synthesis as the synthesized signal with respect to the amount of incident light equal to or greater than the saturated amount of light.

In FIG. 11, a relation is illustrated when a change occurs so that the luminance of the short-time exposure pixel is brightened due to a motion of a subject. The HDR synthesizing circuit 50 performs the same luminance interlock process, when the change occurs so that the luminance of the short-time exposure pixel is brightened due to a motion of a subject and when the change occurs so that the luminance of the short-time exposure pixel is darkened.

Figure 12:
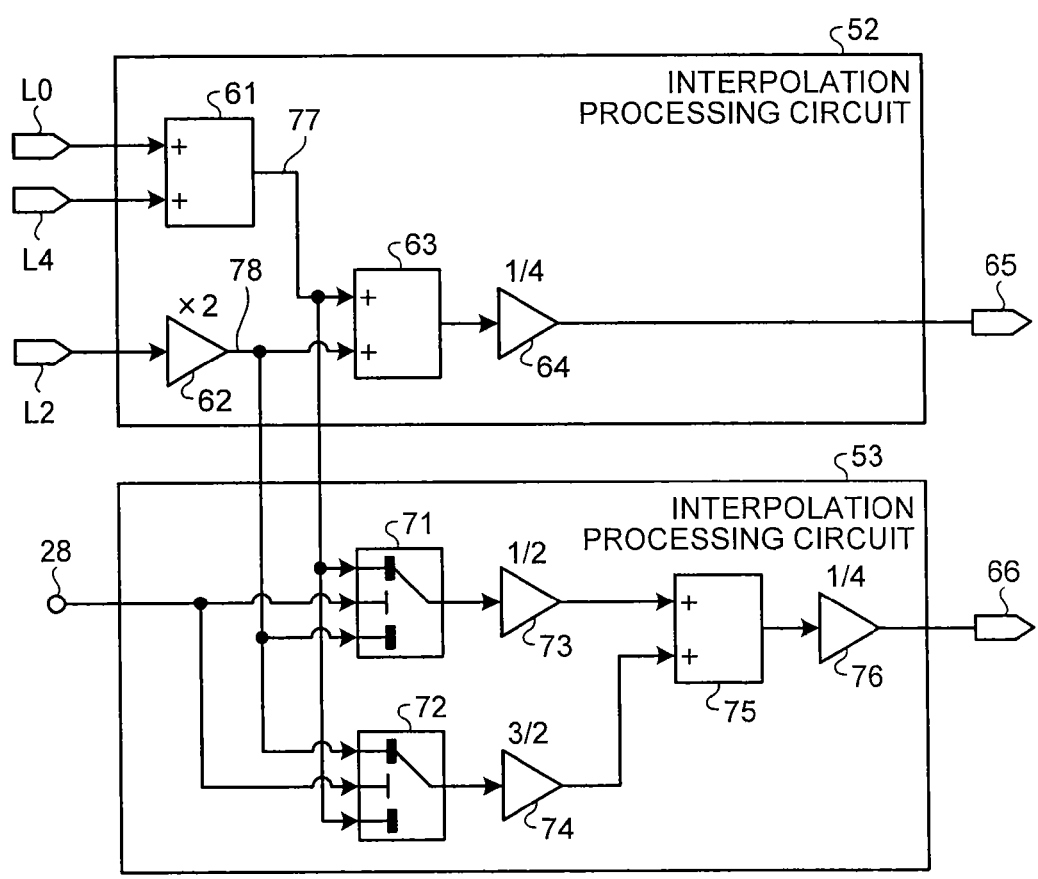
FIG. 12 is a block diagram illustrating the configurations of two interpolation processing circuits.

FIG. 12 is a block diagram illustrating the configurations of two interpolation processing circuits. In the luminance interlock processing unit 51, the interpolation processing circuits 52 and 53 generate a first mixture signal 65 by the 50% blend synthesis and a second mixture signal 66 by the 75% blend synthesis in parallel.

Three lines L0, L2, and L4 from the signal level adjusting unit 22 are input to the interpolation processing circuit 52. The interpolation processing circuit 52 has the same configuration as the interpolation processing unit 23 (see FIG. 4) of the first embodiment. The interpolation processing circuit 52 generates the first mixture signal 65 by the 50% blend synthesis as an interpolated signal. The first mixture signal 65 is a signal in which the first and second image signals are mixed at a first ratio of 1:1.

An adder 61 adds the lines L0 and L4. A multiplier 62 doubles the line L2. Adder 63 adds a signal 77 which is the addition result of the adder 61 and a signal 78 which is the multiplication result of the multiplier 62. A multiplier 64 multiplies the addition result of the adder 63 by ¼. The interpolation processing circuit 52 outputs the multiplication result of the multiplier 64 as a first mixture signal 65.

The interpolation processing circuit 53 generates a second mixture signal 66 through the 75% blend synthesis as an interpolation signal. The second mixture signal 66 is a signal in which the first and second image signals are mixed at a ratio of 3:1 which is a second ratio. The second ratio is a ratio which the first image signal is weighted in comparison to the first ratio.

A selector 71 selects any one of the signal 77 from the adder 61 of the interpolation processing circuit 52 and the signal 78 from the multiplier 62 of the interpolation processing circuit 52 by using a line identification count 28 as a selection control input signal. When the selection control input signal is "1," the selector 71 selects the signal 77 which is the addition result of the lines L0 and L4 obtained by the adder 61. When the selection control signal is "0," the selector 71 selects the signal 78 which is the multiplication result for the line L2. Thus, the selector 71 normally outputs the second image signal from the short-time exposure pixel.

A selector 72 selects any one of the signal 77 from the adder 61 and the signal 78 from the multiplier 62 by using the line identification count 28 as the selection control input signal. When the selection control input signal is "1," the selector 72 selects the signal 78 which is the multiplication result for the line L2. When the selection control input signal is "0," the selector 72 selects the signal 77 which is the addition result of the lines L0 and L4. Thus, the selector 72 normally outputs the first image signal from the long-time exposure pixel.

A multiplier 73 multiplies the selection result of the selector 71 by ½. A multiplier 74 multiplies the selection result of the selector 72 by ³⁄₂. The interpolation processing circuit 53 adjusts the ratio of the first image signal to the second image signal to 3:1 through the multiplications of the multipliers 73 and 74.

An adder 75 adds the multiplication result of the multiplier 73 and the multiplication result of the multiplier 74. A multiplier 76 multiplies the addition result of the adder 75 by ¼. The interpolation processing circuit 53 outputs the multiplication result of the multiplier 76 as the second mixture signal 66.

The expansion processing circuit 54 performs an expansion process on a signal of which a level is higher than the output saturation level among the first mixture signals 65 from the interpolation processing circuit 52 through the HDR synthesis by an exceeding level from the output saturation level. The expansion processing circuit 54 outputs a first mixture signal 67 subjected to the expansion process. The expansion processing circuit 54 has the same configuration as the expansion processing unit 24 (see FIG. 9) of the first embodiment.

The expansion processing circuit 55 performs an expansion process on a signal of which a level is higher than the output saturation level among the second mixture signals 66 from the interpolation processing circuit 53 through the HDR synthesis by an exceeding level from the output saturation level. The expansion processing circuit 55 outputs a second mixture signal 68 subjected to the expansion process. The expansion processing circuit 55 has the same configuration as the expansion processing unit 24 (see FIG. 9) of the first embodiment.

Figure 13:
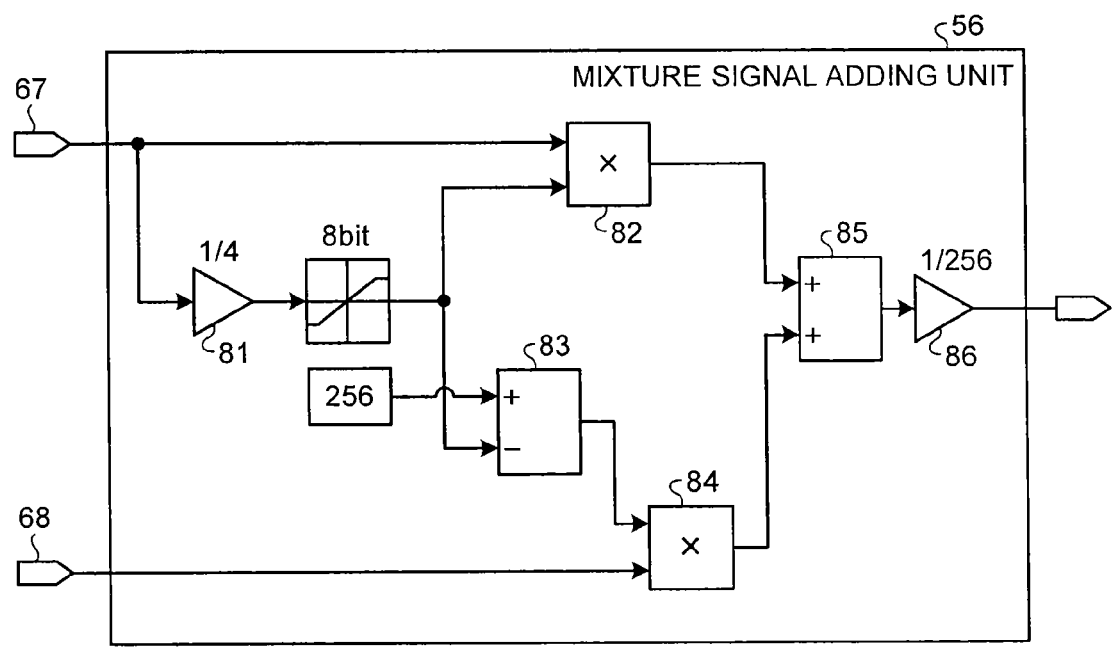
FIG. 13 is a block diagram illustrating the configuration of a mixture signal adding unit.

FIG. 13 is a block diagram illustrating the configuration of a mixture signal adding unit. The mixture signal adding unit 56 adds the first mixture signal 67 and the second mixture signal 68 subjected to the expansion process at a ratio appropriate to the luminance of a target pixel. In this embodiment, the mixture signal adding unit 56 uses the level of the first mixture signal 67 input to the mixture signal adding unit 56 as the luminance of the long-time exposure pixel or the short-time exposure pixel which is set as a target pixel.

A multiplier 81 multiplies the first mixture signal 67 input to the mixture signal adding unit 56 by ¼ and sets the multiplication result as an 8-bit signal. A multiplier 82 multiplies the first mixture signal 67 input to the mixture signal adding unit 56 by the multiplication result of the multiplier 81.

A subtracter 83 subtracts the multiplication result of the multiplier 82 from the output saturation level (256 LBS) converted to 8 bits. A multiplier 84 multiplies the subtraction result of the subtracter 83 by the second mixture signal 68 input to the mixture signal adding unit 56.

An adder 85 adds the multiplication result for the first mixture signal 67 obtained by the multiplier 82 and the multiplication result of the second mixture signal 68 obtained by the multiplier 84. A multiplier 86 multiplies the addition result of the adder 85 by ¹⁄₂₅₆. The mixture signal adding unit 56 outputs the multiplication result of the multiplier 86.

The mixture signal adding unit 56 adjusts a ratio between a signal component originated from the long-time exposure pixel and a signal component originated from the short-time exposure pixel by adjusting the ratio between the first and second mixture signals to be mutually added in accordance with the luminance of a target pixel. The HDR synthesizing circuit 50 outputs the signal from the mixture signal adding unit 56 as a synthesized image signal.

Thus, when the luminance of a target pixel is lower than the luminance corresponding to the output saturation level, the mixture signal adding unit 56 adjusts the ratio such that the second mixture signal 68 is weighted. When the luminance of the target pixel is equal to or greater than the luminance corresponding to the output saturation level, the mixture signal adding unit 56 outputs the first mixture signal 67 as the synthesized image signal without performing the adjustment using the second mixture signal 68.

The mixture signal adding unit 56 is configured to adjust the ratio between the first mixture signal 67 and the second mixture signal 68 using the 8-bit resolution, but the resolution may not be 8 bits. For example, the mixture signal adding unit 56 may apply 10 bits which is the resolution of the first and second image signals to the adjustment of the ratio between the first mixture signal 67 and the second mixture signal 68 without change.

The HDR synthesizing circuit 50 performs the HDR synthesis using the first image signal from the long-time exposure pixel and the second image signal from the short-time exposure pixel. The HDR synthesizing circuit 50 acquires a synthesized image without the reduction in the resolution of the image sensor 10 by performing the interpolation process on the output from the long-time exposure line area 15 and the output from the short-time exposure line area 16. As in the first embodiment, the HDR synthesizing circuit 50 can suppress the blur of a subject image and the deterioration in a resolution, and thus can perform effective high dynamic range synthesis.

Further, when the amount of incident light is less than the saturated amount of light, the HDR synthesizing circuit 50 increases the ratio of the signal component originated from the long-time exposure pixel as the amount of incident light is smaller. Thus, the HDR synthesizing circuit 50 can suppress deterioration in the SNR in the case of low illuminance, and thus can acquire a high-quality image from which noise is reduced.

When the amount of incident light is greater than the saturated amount of light, the HDR synthesizing circuit 50 applies the 50% blend synthesis. The HDR synthesizing circuit 50 can minimize a variation in a signal level useless in the HDR synthesis with respect to the illuminance for which the deterioration in the SNR is relatively small, and can effectively reduce a defect such as a false color.

The second ratio of the second mixture signal 66 is not limited to the case in which the ratio of the signal component originated from the long-time exposure pixel is set to 75%. The second ratio may be set such that the ratio of the signal component originated from the long-time exposure pixel is higher than at least 50%.

Figure 14:
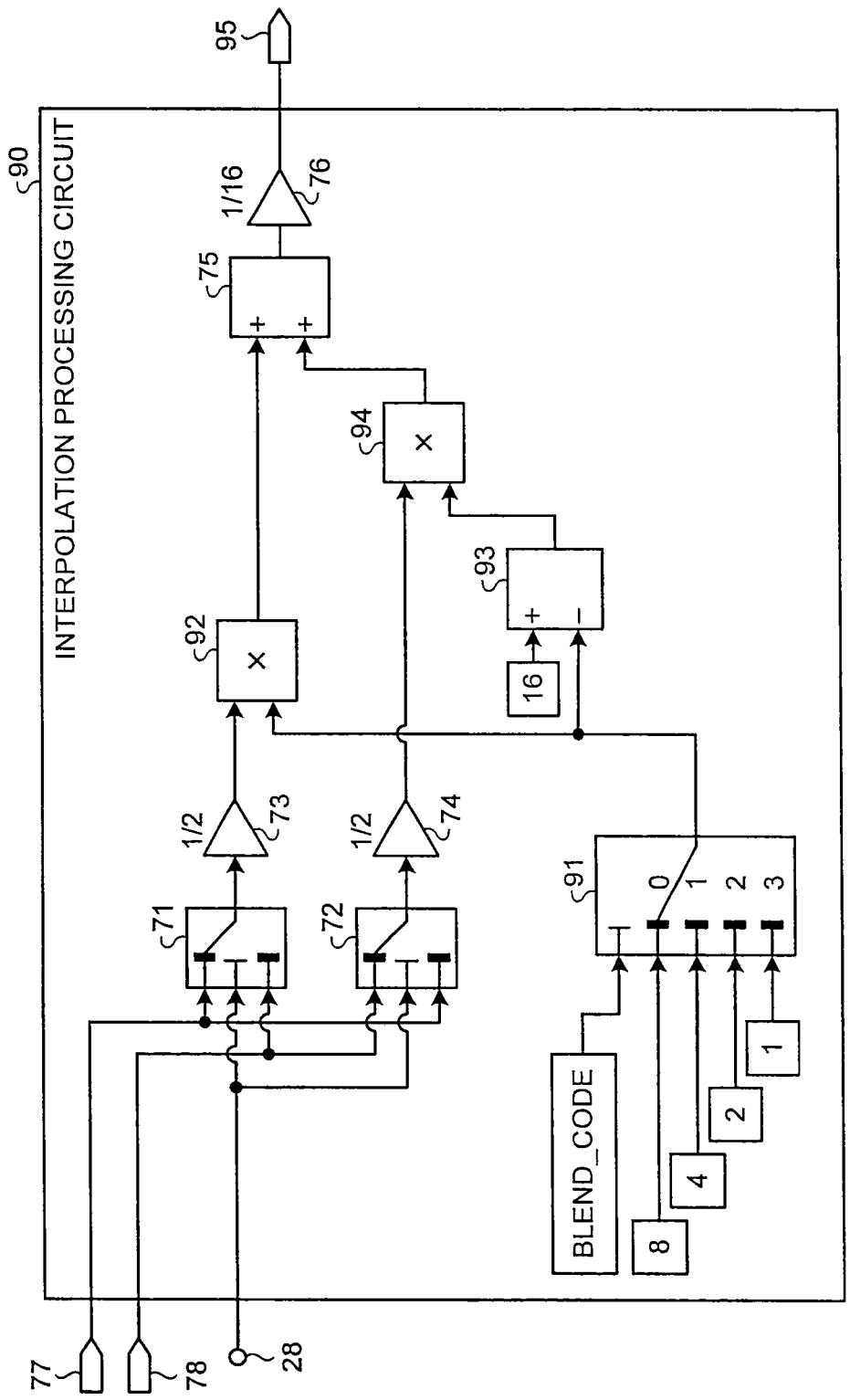
FIG. 14 is a block diagram illustrating an interpolation processing circuit generating a second mixture signal according to a modification example.

FIG. 14 is a block diagram illustrating an interpolation processing circuit generating a second mixture signal according to a modification example. In this modification example, an interpolation processing circuit 90 changes a second ratio of a second mixture signal 95 in accordance with a blend code (BLEND_CODE) set to be switchable. BLEND_CODE is a code appropriate to a mode of HDR synthesis and is configured to be changed, for example, in response to mode selection of a user.

The signal 77 from the adder 61 of the interpolation processing circuit 52 and the signal 78 from the multiplier 62 of the interpolation processing circuit 52 illustrated in FIG. 12 are input to the interpolation processing circuit 90. A selector 71 selects any one of the signal 77 from the adder 61 and the signal 78 from the multiplier 62 by using the line identification count 28 as a selection control input signal.

When the selection control input signal is "1," the selector 71 selects the signal 77 which is the addition result of the lines L0 and L4 obtained by the adder 61. When the selection control input signal is "0," the selector 71 selects the signal 78 which is the multiplication result of the line L2 obtained by the multiplier 62. Thus, the selector 71 normally outputs the second image signal from the short-time exposure pixel. A multiplier 73 multiplies the selection result of the selector 71 by ½.

A selector 72 selects any one of the signal 77 from the adder 61 and the signal 78 from the multiplier 62 by using the line identification count 28 as the selection control input signal. When the selection control input signal is "1," the selector 72 selects the signal 78 which is the multiplication result of the line L2 obtained by the multiplier 62. When the selection control input signal is "0," the selector 72 selects the signal 77 which is the addition result of the lines L0 and L4 obtained by the adder 61. Thus, the selector 72 normally outputs the first image signal from the long-time exposure pixel. A multiplier 74 multiplies the selection result of the selector 72 by ½.

A selector 91 selects any one of coefficients 8, 4, 2, and 1 by using BLEND_CODE as a selection control input signal. For example, BLEND_CODE is each of the signals from "0" to "3" indicating four modes of the HDR synthesis.

For example, when BLEND_CODE is "0," the selector 91 selects coefficient 8. When BLEND_CODE is "1," the selector 91 selects coefficient 4. When BLEND_CODE is "2," the selector 91 selects coefficient 2. When BLEND_CODE is "3," the selector 91 selects coefficient 1.

A multiplier 92 multiplies the signal from the multiplier 73 by the coefficient selected by the selector 91. A subtracter 93 subtracts the coefficient selected by the selector 91 from coefficient 16. A multiplier 94 multiplies the signal from the multiplier 74 by the subtraction result of the subtracter 93. The adder 75 adds the multiplication result of the multiplier 92 and the multiplication result of the multiplier 94. The multiplier 76 multiples the addition result of the adder 75 by ¹⁄₁₆. The interpolation processing circuit 90 outputs the multiplication result of the multiplier 76 as the second mixture signal 95.

The interpolation processing circuit 90 outputs the second mixture signal 95 in which the first and second image signals are mixed at a ratio of 1:1, when BLEND_CODE is "0" (50% blend synthesis). The interpolation processing circuit 90 outputs the second mixture signal 95 in which the first and second image signals are mixed at a ratio of 3:1, when BLEND_CODE is "1" (75% blend synthesis).

The interpolation processing circuit 90 outputs the second mixture signal 95 in which the first and second image signals are mixed at a ratio of 7:1, when BLEND_CODE is "2" (87.5% blend synthesis). The interpolation processing circuit 90 outputs the second mixture signal 95 in which the first and second image signals are mixed at a ratio of 15:1, when BLEND_CODE is "3" (93.75% blend synthesis).

Thus, the interpolation processing circuit 90 generates the second mixture signal 95 in which the second ratio is changed in accordance with BLEND_CODE. Accordingly, the interpolation processing circuit 90 can perform the interpolation process in response to a demand of the user.

Figure 15:
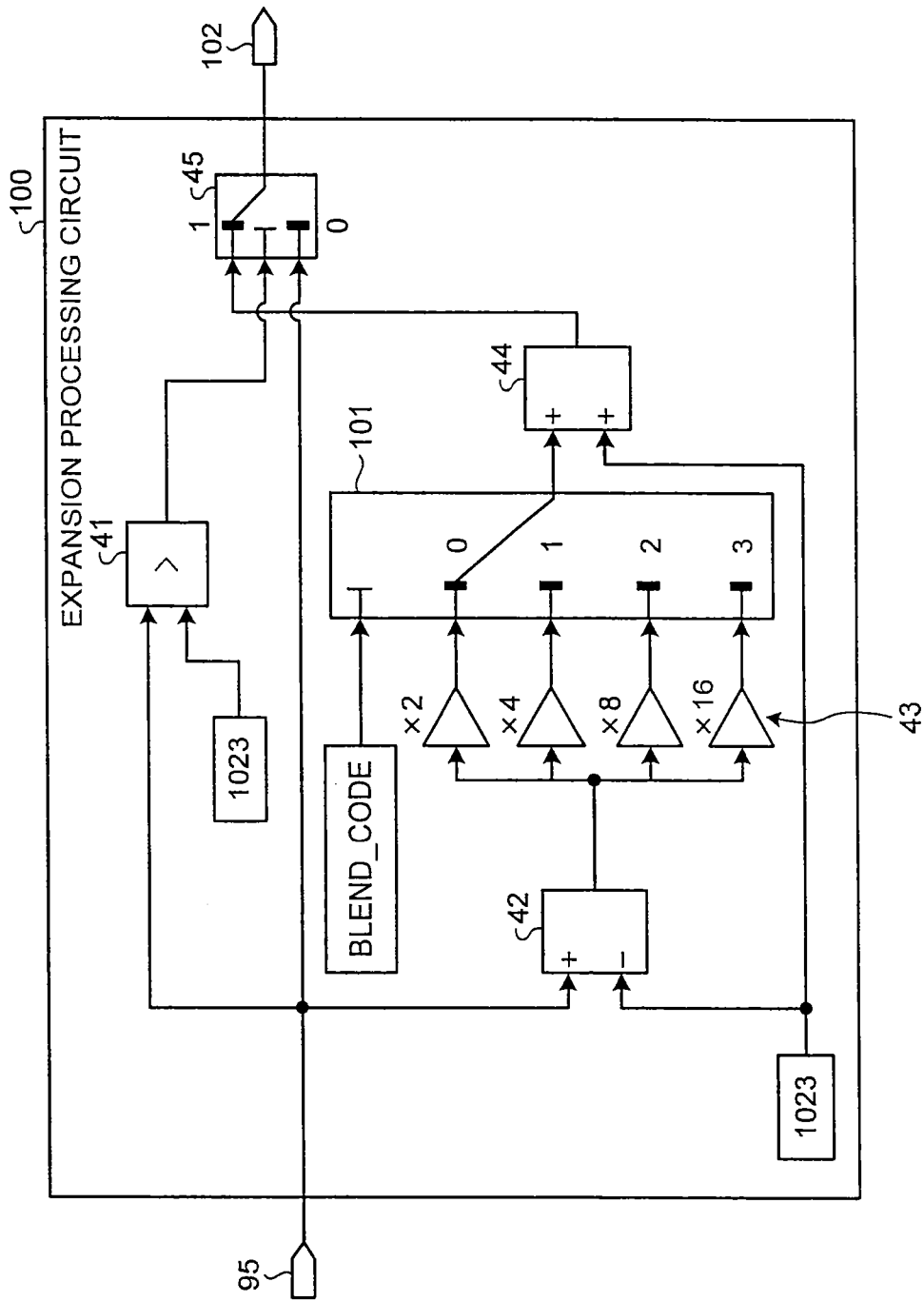
FIG. 15 is a block diagram illustrating an expansion processing circuit that performs an expansion process on the second mixture signal according to the modification example.

FIG. 15 is a block diagram illustrating an expansion processing circuit that performs an expansion process on the second mixture signal according to the modification example. In this modification example, an expansion processing circuit 100 changes a ratio of expansion to an exceeding level from the output saturation level in accordance with BLEND_CODE.

The second mixture signal 95 from the interpolation processing circuit 90 illustrated in FIG. 14 is input to the expansion processing circuit 100. The second mixture signal 66 from the interpolation processing circuit 53 illustrated in FIG. 12 may be input to the expansion processing circuit 100.

A comparator 41 compares the second mixture signal 95 input to the expansion processing circuit 100 with a predetermined output saturation level (for example, 1023 LBS). The comparator 41 outputs, for example, "1" as the comparison result, when the second mixture signal 95 is greater than the output saturation level. The comparator 41 outputs, for example, "0" as the comparison result, when the second mixture signal 95 is equal to or less than the output saturation level.

A subtracter 42 subtracts the output saturation level from the second mixture signal 95 input to the expansion processing circuit 100. A selector 101 selects any one of a signal obtained by multiplying the subtraction result of the subtracter 42 by magnification 2 by the multiplier 43, a signal obtained by multiplying the subtraction result by magnification 4, a signal obtained by multiplying the subtraction result by magnification 8, and a signal obtained by multiplying the subtraction result by magnification 16 by using BLEND_CODE as a selection control input signal.

For example, when BLEND_CODE is "0," the selector 91 selects the signal obtained by multiplying the subtraction result by magnification 2. When BLEND_CODE is "1," the selector 91 selects the signal obtained by multiplying the subtraction result by magnification 4. When BLEND_CODE is "2," the selector 91 selects the signal obtained by multiplying the subtraction result by magnification 8. When BLEND_CODE is "3," the selector 91 selects the signal obtained by multiplying the subtraction result by magnification 16.

An adder 44 adds the output saturation level to the signal selected by the selector 101. A selector 45 selects any one of the signal from the adder 44 and the second mixture signal 95 input to the expansion processing circuit 100 by using the comparison result from the comparator 41 as the selection control input signal. When the selection control input signal is "1," the selector 45 selects the signal subjected to the expansion signal using the multiplier 43 and output from the adder 44. When the selection control input signal is "0," the selector 45 selects the second mixture signal 95 before the expansion process.

The expansion processing circuit 100 outputs the signal selected by the selector 45 as the second mixture signal 102. The mixture signal adding unit 56 (see FIG. 10) adds the first mixture signal 67 from the expansion processing circuit 54 and the second mixture signal 102 from the expansion processing circuit 100.

Thus, the expansion processing circuit 100 outputs the second mixture signal 102 in which the magnification of the expansion process is changed in accordance with BLEND_CODE. Accordingly, the expansion processing circuit 100 can perform the expansion process in response to a demand of the user.

Each circuit configuration described in this embodiment may be a configuration in which the functions described in this embodiment can be realized and may be appropriately modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image processing device comprising:
a high dynamic range synthesizing circuit that synthesizes a first image signal in accordance with an amount of incident light on each first pixel during a first charge accumulation period and a second image signal in accordance with an amount of incident light on each second pixel during a second charge accumulation period shorter than the first charge accumulation period,
wherein the high dynamic range synthesizing circuit includes
a signal level adjusting unit that adjusts a signal level of the second image signal in accordance with a ratio between the first and second charge accumulation periods,
an interpolation processing unit to which the first image signal and the second image signal of which the signal level is adjusted by the signal level adjusting unit are input and that generates interpolated signals, and
an expansion processing unit that performs an expansion process between the interpolated signals by a signal level exceeding an output saturation level at which saturation of an output charge for the amount of incident light during the first charge accumulation period occurs,
wherein the interpolation processing unit
generates the interpolated signal through an interpolation process on the first pixel, which is set as a target pixel, using the second image signal from each second pixel which is a peripheral pixel located in periphery of the first pixel which is the target pixel, and generates the interpolated signal through an interpolation process on the second pixel, which is set as a target pixel, using the first image signal from each first pixel which is a peripheral pixel located in periphery of the second pixel which is the target pixel.

2. The image processing device according to claim 1, wherein the interpolation processing unit performs the interpolation process such that a signal component originated from the first pixel and a signal component originated from the second pixel are equally included.

3. The image processing device according to claim 1, wherein the high dynamic range synthesizing circuit further includes a mixture signal adding unit that adds a first mixture signal in which the first and second image signals are mixed at a first ratio and a second mixture signal in which the first and second image signals are mixed at a second ratio,
wherein the second ratio is a ratio in which the first image signal is weighted for the first ratio,
wherein the interpolation processing unit concurrently generates the first and second mixture signals as the interpolated signals, and
wherein the mixture signal adding unit adds the first and second mixture signals subjected to the expansion process at a ratio appropriate to luminance of the target pixel.

4. The image processing device according to claim 3, wherein the mixture signal adding unit performs adjustment so that the second mixture signal is weighted, when the luminance of the target pixel is lower than luminance corresponding to the output saturation level.

5. The image processing device according to claim 3, wherein the mixture signal adding unit outputs the first mixture signal, when the luminance of the target pixel is higher than luminance corresponding to the output saturation level.

6. The image processing device according to claim 3, wherein the first ratio is a ratio of 1:1.

7. The image processing device according to claim 3, wherein the interpolation processing unit changes the second ratio in accordance with a switchable set code.

8. The image processing device according to claim 3, wherein the expansion processing unit changes a ratio of the expansion process for the second mixture signal in accordance with a switchable set code.

9. The image processing device according to claim 1, wherein the peripheral pixels are eight pixels included in a pixel block centering on the target pixel and are pixels with the same color as that of the target pixel.

10. An image processing method comprising:
high dynamic range synthesis of synthesizing a first image signal in accordance with an amount of incident light on each first pixel during a first charge accumulation period and a second image signal in accordance with an amount of incident light on each second pixel during a second charge accumulation period shorter than the first charge accumulation period,
wherein the high dynamic range synthesis includes
adjusting a signal level of the second image signal in accordance with a ratio between the first and second charge accumulation periods,
generating interpolated signals using the first image signal and the second image signal of which the signal level is adjusted, and
performing an expansion process between the interpolated signals by a signal level exceeding an output saturation level at which saturation of an output charge for the amount of incident light during the first charge accumulation period occurs,
wherein, in the generating of the interpolated signals,
an interpolation process is performed on the first pixel, which is set as a target pixel, using the second image signal from each second pixel which is a peripheral pixel located in periphery of the first pixel which is the target pixel, and
an interpolation process is performed on the second pixel, which is set as a target pixel, using the first image signal from each first pixel which is a peripheral pixel located in periphery of the second pixel which is the target pixel.

11. The image processing method according to claim 10, wherein the interpolation process is performed such that a signal component originated from the first pixel and a signal component originated from the second pixel are equally included.

12. The image processing method according to claim 10, wherein the high dynamic range synthesis further includes adding a first mixture signal in which the first and second image signals are mixed at a first ratio and a second mixture signal in which the first and second image signals are mixed at a second ratio,
wherein the second ratio is a ratio in which the first image signal is weighted for the first ratio,
wherein the first and second mixture signals are concurrently generated as the interpolated signals, and
wherein the first and second mixture signals subjected to the expansion process are added at a ratio appropriate to luminance of the target pixel.

13. The image processing method according to claim 12, wherein in the adding of the first and second mixture signals, adjustment is performed so that the second mixture signal is weighted, when the luminance of the target pixel is lower than luminance corresponding to the output saturation level.

14. The image processing method according to claim 12, wherein the first mixture signal is output as a high dynamic range synthesis signal, when the luminance of the target pixel is higher than luminance corresponding to the output saturation level.

15. The image processing method according to claim 12, wherein the first ratio is a ratio of 1:1.

16. The image processing method according to claim 12, wherein the second ratio is changed in accordance with a switchable set code.

17. The image processing method according to claim 12, wherein a ratio of the expansion process for the second mixture signal is changed in accordance with a switchable set code.

18. The image processing method according to claim 10, wherein the peripheral pixels are eight pixels included in a pixel block centering on the target pixel and are pixels with the same color as that of the target pixel.

19. A solid-state imaging device comprising:
a pixel array that first pixels detecting an amount of incident light during a first charge accumulation period and second pixels detecting an amount of incident light during a second charge accumulation period shorter than the first charge accumulation period; and
a high dynamic range synthesizing circuit that synthesizes a first image signal output in accordance with the amount of incident light by the first pixel and a second image signal output in accordance with the amount of incident light by the second pixel,
wherein the high dynamic range synthesizing circuit includes a signal level adjusting unit that adjusts a signal level of the second image signal in accordance with a ratio between the first and second charge accumulation periods, an interpolation processing unit to which the first image signal and the second image signal of which the signal level is adjusted by the signal level adjusting unit are input and that generates interpolated signals, and an expansion processing unit that performs an expansion process between the interpolated signals by a signal level exceeding an output saturation level at which saturation of an output charge for the amount of incident light during the first charge accumulation period occurs, wherein the interpolation processing unit generates the interpolated signal through an interpolation process on the first pixel, which is set as a target pixel, using the second image signal from each second pixel which is a peripheral pixel located in periphery of the first pixel which is the target pixel, and generates the interpolated signal through an interpolation process on the second pixel, which is set as a target pixel, using the first image signal from each first pixel which is a peripheral pixel located in periphery of the second pixel which is the target pixel.

20. The solid-state imaging device according to claim 19, wherein in the pixel array, a first line area in which the first pixels are parallel in a horizontal direction and a second line area in which the second pixels are parallel in the horizontal direction are alternately arranged in a vertical direction, and wherein the interpolation processing unit performs an interpolation process on the first pixel, which is set as the target pixel, using the second image signals from the second pixels which are the peripheral pixels included in the second line area adjacent to the first line area including the first pixel which is the target pixel, and performs an interpolation process on the second pixel, which is set as the target pixel, using the first image signals from the first pixels which are the peripheral pixels included in the first line area adjacent to the second line area including the second pixel which is the target pixel.

\* \* \* \* \*